(12) United States Patent
Bier et al.

(10) Patent No.: US 11,070,231 B2
(45) Date of Patent: Jul. 20, 2021

(54) REDUCING STORAGE OF BLOCKCHAIN METADATA VIA DICTIONARY-STYLE COMPRESSION

(71) Applicant: Palo Alto Research Center Incorporated, Palo Alto, CA (US)

(72) Inventors: Eric Allan Bier, Palo Alto, CA (US); Alejandro Brito, Mountain View, CA (US); Shantanu Rane, Menlo Park, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 305 days.

(21) Appl. No.: 16/237,586

(22) Filed: Dec. 31, 2018

(65) Prior Publication Data

US 2020/0212932 A1  Jul. 2, 2020

(51) Int. Cl.
*G06F 16/21* (2019.01)
*H03M 7/30* (2006.01)
*H04L 9/06* (2006.01)
*G06F 16/907* (2019.01)

(52) U.S. Cl.
CPC .......... *H03M 7/702* (2013.01); *G06F 16/211* (2019.01); *G06F 16/907* (2019.01); *H04L 9/0637* (2013.01); *H04L 9/0643* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 10,594,689 B1* | 3/2020 | Weaver | H04L 9/3247 |
| 2011/0173166 A1* | 7/2011 | Teerlink | G06F 16/283 |
| | | | 707/693 |
| 2015/0032705 A1* | 1/2015 | Ideuchi | G06F 16/1744 |
| | | | 707/693 |
| 2015/0286668 A1* | 10/2015 | Legler | G06F 16/2379 |
| | | | 707/736 |
| 2016/0358312 A1* | 12/2016 | Kolb, V. | G06T 3/40 |
| 2016/0366534 A1* | 12/2016 | Griesmann | H04L 67/42 |
| 2017/0048235 A1* | 2/2017 | Lohe | G06Q 20/065 |
| 2017/0085555 A1* | 3/2017 | Bisikalo | H04L 9/3236 |
| 2017/0126851 A1* | 5/2017 | Mosko | H04L 45/74 |
| 2017/0279931 A1* | 9/2017 | Schurman | G06F 16/2228 |
| 2019/0026146 A1* | 1/2019 | Peffers | G06F 9/5044 |
| 2020/0110838 A1* | 4/2020 | Pasha | G06F 16/34 |
| 2020/0117690 A1* | 4/2020 | Tran | G10L 15/26 |
| 2020/0134530 A1* | 4/2020 | Clevenger | H04L 67/10 |

* cited by examiner

*Primary Examiner* — Wilson Lee
(74) *Attorney, Agent, or Firm* — Womble Bond Dickinson (US) LLP

(57) ABSTRACT

A method of reducing the storage requirements of blockchain metadata via dictionary-style compression includes receiving a request to add a transaction block to a blockchain. The method further includes determining an identifier (ID) of a dictionary block most recently stored on the blockchain. The method further includes compressing, by a processing device, one or more transactions of the transaction block based on the dictionary block to generate a compressed transaction block. The method further includes adding the ID of the dictionary block to the compressed transaction block. The method further includes providing the compressed transaction block, including the ID of the dictionary block, for storage on the blockchain.

4 Claims, 12 Drawing Sheets

200

T-Block 1 202

T-Block 2 204

T-Block 3 206

∙
∙
∙

T-Block N 208

Fig. 2

| Seller | Buyer | Number | Street | City | State | Date | Amount |
|---|---|---|---|---|---|---|---|
| Diane Doe | John Jacobs | 220 | Oak Street | Austin | TX | 2/24/2018 | 372000 |
| May Ng | Rick Zea | 345 | River Road | San Jose | CA | 2/5/2018 | 795000 |
| ... | ... | ... | ... | ... | ... | ... | ... |
| Sam Smith | Thomas Tin | 1010 | Brock Blvd | Milpitas | CA | 2/5/2018 | 810000 |

D-Block 0 401

T-Block 1 402

T-Block 2 404

T-Block 3 406

. . .

D-Block N 407

T-Block N+1 408

| Dictionary 1 | 502a |
| Dictionary 2 | 502b |
| Dictionary ... | 502c |
| Dictionary N | 502d |

| Schema 1 | 504a |
| Schema 2 | 504b |
| Schema ... | 504c |
| Schema M | 504d |

REDUCING STORAGE OF BLOCKCHAIN METADATA VIA DICTIONARY-STYLE COMPRESSION

TECHNICAL FIELD

Implementations of the present disclosure relate to reducing storage of blockchain metadata via dictionary-style compression.

BACKGROUND

Blockchains provide a reliable, distributed, immutable, and persistent ledger of transactions. Currently popular blockchain applications, such as Bitcoin and Ethereum, contain very little information about each transaction beyond representations of the associated buyer, seller, and transaction amount. One reason for the lack of metadata is that every byte added to the blockchain increases the cost of the blockchain in CPU cycles, storage, and network bandwidth.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a block diagram illustrating blockchain transaction blocks, in accordance with some embodiments.

FIG. 3 is a block diagram illustrating data of an example transaction block, in accordance with some embodiments.

FIG. 4 is a block diagram illustrating blockchain transaction blocks and dictionary blocks, in accordance with some embodiments.

DETAILED DESCRIPTION

Figure 1:
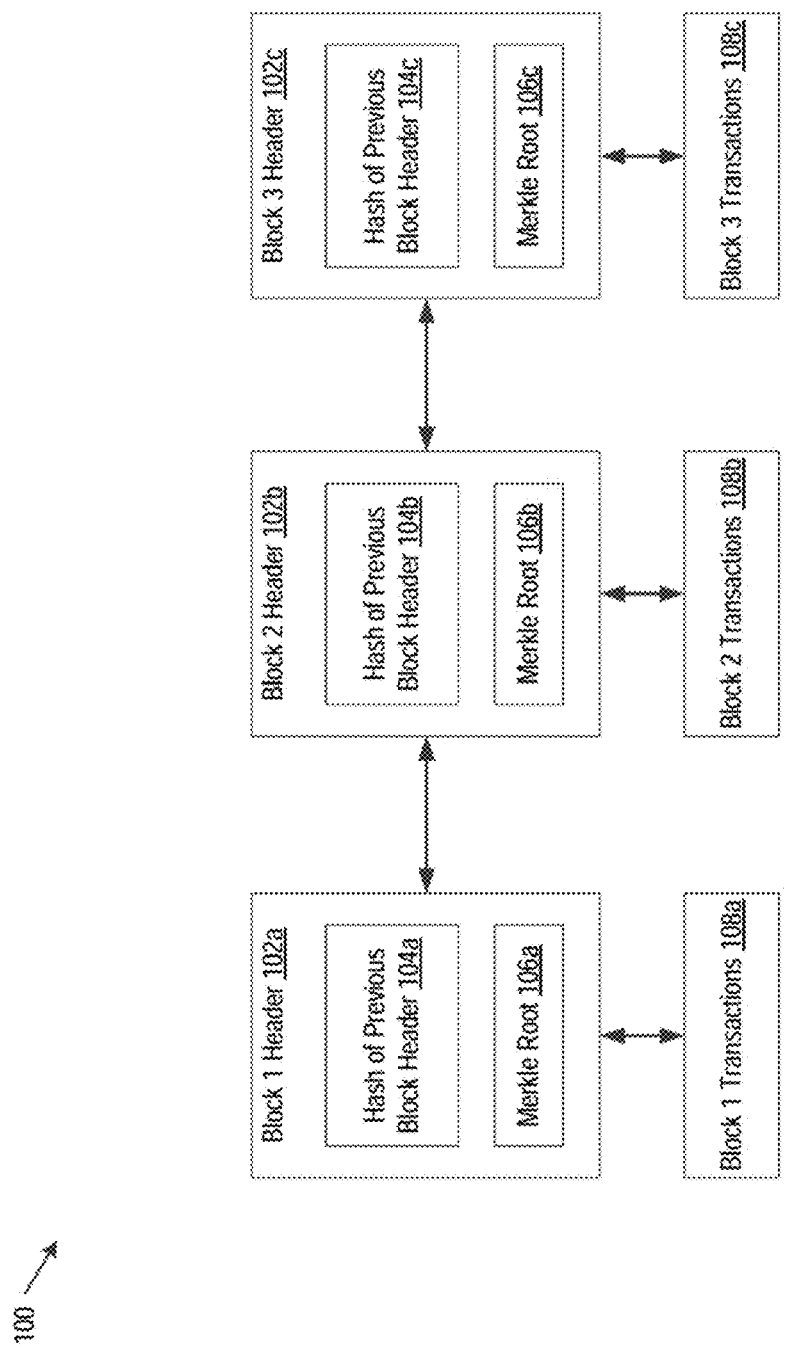
FIG. 1 is a block diagram illustrating a blockchain system, in accordance with some embodiments.

Blockchain technology may provide a reliable, distributed, public, immutable ledger of transactions, and it is being used as the basis for a variety of distributed applications. However, the many advantages of blockchains come at a cost. For example, due to the distributed nature of the technology, each gigabyte of data that is added to a blockchain must be transmitted over the Internet to distributed computing systems (e.g., computing devices, client devices, computers, etc.), often called peers, that maintain the blockchain. This same gigabyte must be verified, run through hash functions, and stored perpetually. In short, adding data to a blockchain may be expensive.

As a result, application developers have greatly restricted the data that is stored on blockchains. Popular blockchains, such as Bitcoin and Ethereum, may store little more than the alias of the buyer, the alias of the seller, and the amount of the corresponding transaction. Bitcoin, for example, allows only an additional 83 bytes of information per transaction. It would be advantageous in a variety of contexts to build a distributed application with more information about each transaction. In one example, such a system may be used to generate and maintain a reliable, distributed, public immutable ledger of real estate transactions. In this case, the ledger may include a variety of information, such as the address of each property, its lot number, its county, the type of property, and so on.

In one embodiment, to overcome some of the problems described above, additional metadata corresponding to each transaction may be stored outside of the blockchain in an online data store, such as a distributed hash table. A hash of the data can then be computed and stored in the blockchain. Since a hash of the data may generally be smaller than the data itself, this approach may reduce the storage requirements of the blockchain. An application wishing to see the associated data can look it up in the online data store, using the hash as a key. While this approach may work for some applications, it has some significant disadvantages.

For example, it may require that one fund, build, maintain, and verify a reliable online data store in addition to the blockchain system, which can be expensive and inefficient. Furthermore, it may require one to perform many storage operations on the online data store as part of adding a new block to the blockchain and that one perform many retrieval operations on the online data store as part of retrieving transactions from the blockchain, which may also be expensive and inefficient. Further still, using this approach means that the metadata may not come with the same guarantees of persistence and immutability as the data on the blockchain. For example, if the online data store suffers an outage, this may result in blockchain transactions becoming unavailable during the outage even if the blockchain itself is still functioning.

In another embodiment, metadata may be added into the blockchain itself as part of each transaction. This approach has the advantage that the metadata is stored with the same guarantees of persistence, immutability, and reliable access as the rest of the blockchain provides. One problem with this approach, as noted above, is that it can greatly increase the storage requirements of the blockchain, increasing the cost of the blockchain in CPU power, storage space, and network bandwidth in the associated computer systems.

Advantageously, another embodiment described herein reduces the amount of data stored in the blockchain without requiring a separate online data store. In this approach, data is stored in a compressed format in the blockchain itself. A highly efficient compression technique is described herein (although others may be contemplated), which may significantly reduce the number of bytes needed by the data. The compression technique, in turn, takes advantage of the ability of the blockchain to hold persistent immutable data, to store the data structures it uses to achieve efficient compression.

In one embodiment, the compression technique described herein differs from other, similar techniques, at least because it provides for storing arbitrary tuples, which can be decompressed individually, in any order, instead of storing data as a text document containing Resource Description Framework (RDF) triples. Furthermore, the decompression dictionaries generated according to the methods and systems described herein may be stored in the blockchain, thus receiving all of the benefits provided by the blockchain described above.

In one exemplary embodiment, given a blockchain consisting of transactions with metadata that is composed of text strings or data types that can be converted to text strings, a method is provided herein to encode the metadata in a compact way and store it directly on the blockchain. The method applies a class of lossless data compression algorithms known as dictionary or substitution coders to reduce the metadata representation size. The dictionary (hash table or key-value structure) may be used for storing the text to be compressed and a code value representing the text in a more compact form such as a small integer or short string; see examples of dictionaries in FIG. 6.

Figure 5:
FIG. 5 is a block diagram illustrating an example structure of a blockchain dictionary block, in accordance with some embodiments.

The method described herein allows for storage of the dictionaries, and any data structures required by the lossless data compression algorithms (e.g., the schema of the transactions), on the blockchain. The method is based on the realization that the dictionary storage can be implemented with the inclusion of a dictionary block (D-Block) in the blockchain (FIG. 5). A D-Block can be readily identified via an identification number such that any node in the blockchain can access it. Based on desired tradeoffs between the rate at which new dictionary blocks need to be included in the blockchain, and the computational power expended by the nodes to create and mine the dictionary block, creation of a D-block can be handled by all nodes, or a subset of the nodes chosen at random and changed periodically, or a constant designated subset of nodes.

In addition, the method described herein can use other string dictionary techniques for compact representation of the D-Block such as hashing, front coding, grammar-based, and self-indexing. In some blockchain embodiments, if the size of the D-Block is suitable, then the D-Block can be stored within the block of transactions for simplicity and to avoid the overhead of creating a separate block for this purpose.

In some embodiments, the D-block will need to be generated only once and is used for all subsequent data compression operations. In other embodiments, especially when the statistics of information to be written to the blockchain change with time, new D-blocks are generated at regular intervals, resulting in an updated dictionary that is more representative of the new statistics. In still other embodiments, the decision about whether to generate a new D-block or not is delegated to specific blockchain nodes.

It should be noted that although some of the embodiments and examples provided herein are described with respect to real-estate transactions for convenience, the methods and systems described herein are not limited to any particular type of transaction or data. The methods and systems described herein may be used to more efficiently store any type of data on any type of blockchain.

FIG. 1 is a block diagram illustrating a blockchain system 100, in accordance with some embodiments. Although specific components are disclosed in blockchain system 100, it should be appreciated that such components are examples. That is, embodiments of the present invention are well suited to having various other components or variations of the components recited in blockchain system 100. It is appreciated that the components in blockchain system 100 may operate with components other than those presented, and that not all of the components of blockchain system 100 may be required to achieve the goals of blockchain system 100.

Blockchain system 100 may be a decentralized, peer-to-peer networking system. Without a central authority, operations (e.g., transactions) of blockchain system 100 may be managed collectively by peers in the system. Transactions may occur between peers directly and may be recorded on the blockchain itself.

In FIG. 1, blockchain system 100 is a decentralized public database that includes a variety of components, including blockchain headers (102a-c) and transaction blocks (108a-c), and subcomponents, including hashes of previous block headers (104a-c), Merkle Roots (106a-c), and transactions (108a-c). In one embodiment, each block contains a record of recent transactions (e.g., transactions 108a) and a header (e.g., 102a) including a reference to the block that came before it (e.g., 104a) and Merkle Root (e.g., 106a) among other data (e.g., a timestamp).

In one embodiment, a blockchain is collectively maintained by "miners," who are members within the network that compete to validate blockchain transactions in each block by solving the complex mathematical problem associated with the block. In one embodiment, miners are incentivized to validate blockchain transactions by rewarding them with some amount of monetary compensation upon successful completion.

In one embodiment, as described herein, data contained in a block header and/or block transaction data may be compressed according to the methods and systems described herein. For example, in one embodiment, the data included in block 1 transactions 108 may be compressed using a dictionary-style compression technique, thus allowing for more efficient data storage within the block.

FIG. 2 is a block diagram illustrating blockchain 200 transaction blocks 202-208, in accordance with some embodiments. In one embodiment, each of the transaction blocks (e.g., T-blocks) 202-208 may contain uncompressed transaction data. As illustrated, the blockchain 202 is a sequence of T-blocks 202-208. Each T-block (e.g., 202-208) in the blockchain 200, may consist of a list of transactions. Each transaction may then contain a list of data fields that describe that particular transaction. FIG. 3 illustrates an example T-Block (e.g., T-block 1 202), represented as a table of data.

FIG. 3 is a block diagram illustrating data of an example transaction block 300, in accordance with some embodiments. As described above, transaction block 300 may represent a data view of a T-block (e.g., T-block 1 202 of FIG. 2). Each row (e.g., 302) of the transaction block 300 represents a transaction and each column (e.g., "Buyer" 304) represents one field of data pertaining to that transaction. In this example, all of the transactions are real estate sales. In other examples, any other type of transaction may be used, or the transactions may be of mixed types.

In one embodiment, the transaction blocks of FIGS. 2 and 3 require a significant amount of data for each transaction. For example, the last row of FIG. 3 includes roughly 60 characters, even though the names of people and streets are relatively short. If each character requires 16 bits, as is the case in Unicode, it would take 120 bytes to represent this row, plus additional space to encode field boundaries, a unique ID for the transaction and so on.

Advantageously, using the compression technique described herein, the storage capacity of transaction blocks may be greatly increased by performing a compression algorithm over each transaction in the block, using dictionary coding, as described below. In one embodiment, substitution dictionaries may be pre-computed and stored for later use. In other embodiments, substitutionary dictionaries may be computed on the fly. These pre-computed dictionaries may be stored on the blockchain itself in a block called a dictionary block (e.g., "D-Block"). Advantageously, these dictionaries are just as persistent, immutable, and reliably accessed as the data they help to decode. FIG. 4 shows a modified blockchain, in which a few D-Blocks have been added to the normal sequence of T-Blocks.

FIG. 4 is a block diagram illustrating blockchain 400 transaction blocks (402, 404, 406, 408) and dictionary blocks (401, 407), in accordance with some embodiments. As shown, dictionary blocks (e.g., 401, 407) may be added to the blockchain 400 without disrupting the addition of transaction blocks (e.g., 402, 404, 406, and 408) to the same blockchain 400. Advantageously, using static dictionaries for decompressing data contained in transaction blocks allows several advantages to be achieved. First, transactions may be decompressed in any order. Second, individual transactions may be decompressed, without using resources to decompress other, undesired transactions. Third, a very high rate of compression may be achieved overall because dictionaries may be optimized over large bodies of data.

FIG. 5 is a block diagram illustrating an example structure of a blockchain dictionary block 500, in accordance with some embodiments. In one embodiment, each D-block (e.g., D-block 500) contains a list of dictionaries (e.g., 502a-d) that map text strings to compact codes. Each D-block may also contain a list of data schemas (e.g., 504a-d), which indicate which dictionary to use to decode each field of a given type of transaction, such as the sale of a piece of real estate or the sale of an automobile.

Figure 6:
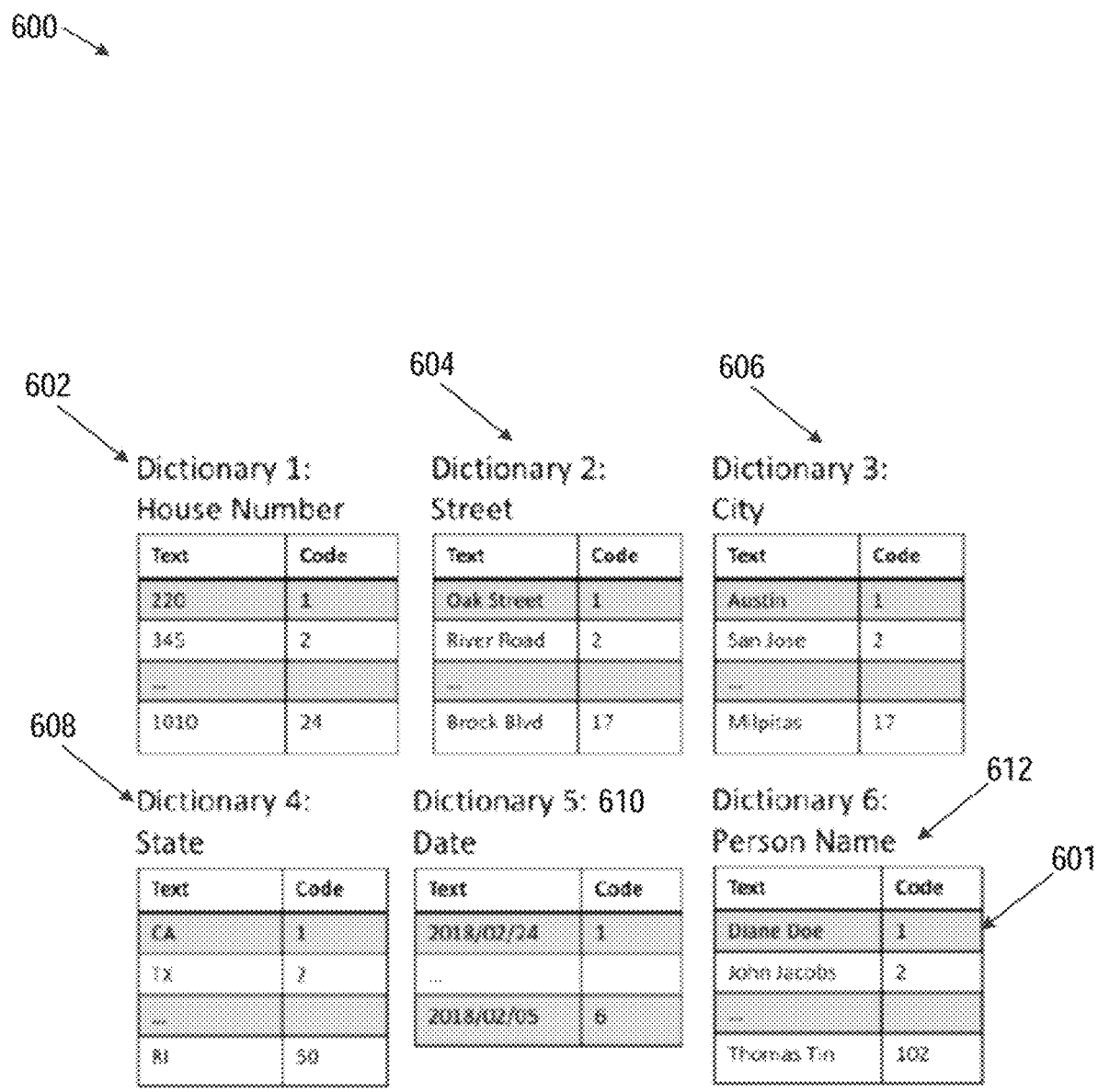
FIG. 6 is a block diagram illustrating the internal structure of a group of compression dictionaries, in accordance with some embodiments.

FIG. 6 is a block diagram 600 illustrating the internal structure of a group of compression dictionaries (602-612), in accordance with some embodiments. In one embodiment, each row (e.g., 601) of each dictionary (e.g., 612) has a text string in the first column and its associated code in the right column (e.g., "Diane Doe" in the first column of dictionary 612 and "1" in the second column). In one embodiment, codes are encoded in binary format for maximum compactness. For example, all of the displayed codes in FIG. 6 can be encoded in an 8-bit byte at the most. As dictionaries get larger, a variable length encoding may be used, so that some codes are encoded in one byte, some in two bytes, some in three bytes, and so on. Optionally, dictionaries may be optimized so that codes that are used more frequently are assigned smaller numbers, needing fewer bytes to represent.

Figure 7:
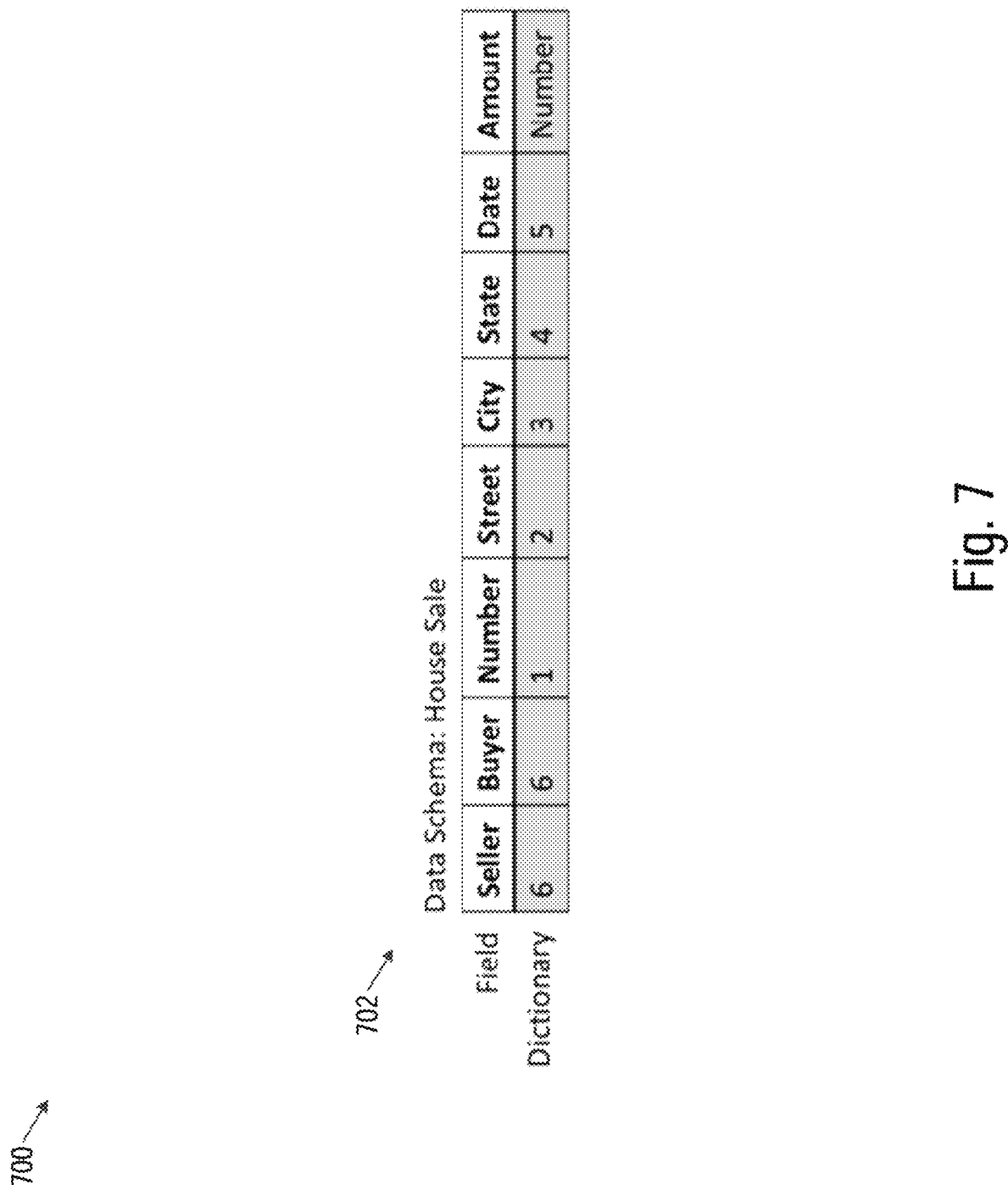
FIG. 7 is a block diagram illustrating an example structure of a data schema in a dictionary block, in accordance with some embodiments.

FIG. 7 is a block diagram 700 illustrating an example structure of a data schema 702 in a dictionary block, in accordance with some embodiments. This schema shows that each "House Sale" transaction may have 8 fields, in this order: Seller, Buyer, Number, Street, City, State, Date, and Amount. For each of these fields, the schema identifies the compression dictionary that will be used to encode and decode that field. For example, the Seller will be encoded using Dictionary 6 612 from FIG. 6, which is the "Person Name" dictionary.

Dictionary coders, such as the technique described herein, can provide very efficient compression of textual data, if the text contains substrings that occur many times. For example, in the current real estate example, one would expect many transactions to have strings like "100," "220," "Oak Street," "Main Street," "Austin," "San Jose," "CA," or "TX" in their street addresses. As such, a dictionary that maps each of these strings to a small integer may be extremely beneficial. In one embodiment, a single dictionary may be used for all fields, or separate dictionaries, e.g., one per field, may be constructed.

Once a large set of transactions have occurred, statistics may be used to identify the strings that occur most frequently and map those frequent strings to the smallest integers, to increase the compression that may be achieved. In one exemplary embodiment, given the D-block of FIGS. 5 and 6, the following transaction: "Diane Doe, John Jacobs, 220 Oak Street, Austin, Tex., 2018/02/24, 372000" may be compressed to "1,2,1,1,1,2,1,372000" since Diane Doe maps to "1" in the Person dictionary, "John Jacobs" maps to "2" in the Person dictionary, "220" maps to "1" in the House Number dictionary, "Oak Street" maps to "1" in the Street dictionary, and so on. The schema above encodes the transaction amount as a number, so "372000" is encoded as a number.

If a careful selection of encoding method occurs, the compressed version of the whole transaction can take as little as 10 bytes, in this case. For comparison, even the Bitcoin blockchain, which is not optimized for the addition of metadata, permits up to 53 bytes to be included with each transaction. To use this scheme, care must be taken to use the correct dictionary to decode the data from each transaction. As the transaction set grows, new dictionaries may be computed to take new values into account that are present in newer transactions, but have no mapping in the older dictionaries. In the meanwhile, new values can be written out in full if they are not yet available in any of the dictionaries. Alternatively, if a new T-Block is encountered that contains many new values, values that are not yet present in the dictionaries, our method may choose to add a new D-Block before adding this T-Block. This new D-Block will contain compact encodings for the new field values. The new T-Block can then be added, with good compression for all of its fields.

As described herein, dictionaries may be stored on the blockchain itself by creating a special Dictionary Block (D-block) for this purpose. As with other blocks on the blockchain, this new block can be verified by blockchain peers to ensure that the table is syntactically valid, that each symbol is used only once per dictionary and so on. If the blockchain is maintained using a proof-of-work algorithm, the dictionary blocks may be mined, just as transaction blocks are currently. The resulting set of dictionaries may be referred to by the block number of the new D-block, in which they are included. If the D-block contains multiple dictionaries (e.g., one for street names, one for city names, etc.), each dictionary may be assigned a unique number within the block, so that a given dictionary may be precisely identified in a given block. As the dictionaries themselves may be stored on the blockchain, the storage requirements of the dictionaries may also be reduced to reduce their cost. One approach to compressing such dictionaries is to use Front Coding as in RDF Header, Dictionary, Triples (HDT) systems. The result can then be further compressed using large text compression methods, for example.

Once a dictionary block (D-block) has been added to the blockchain, it can be used by transactions in blocks that are added later in the blockchain. For example, say transaction block B is to be added to the blockchain, which is full of real estate transactions. A D-block has recently been added with mappings for such transactions and it is block number 1,443 on the block chain. At the top of block B (e.g., in the header of block B), it may be specified that the dictionaries and data schemas on block 1,443 will be used to compress the data fields represented in block B.

If it is determined that a given transaction on the page is a House Sale transaction, then the full representation of that transaction, such as: "Diane Doe, John Jacobs, 220 Oak Street, Austin, Tex., 2018/02/24, 372000" may be received and the dictionaries from block 1,443 may be loaded and used to compress the transaction fields, to get a compressed form like: "1,2,1,1,1,2,1,372000." Any amount of time later, if the transaction is to be read, the dictionary of block 1,443 may be loaded and used to decompress the transaction fields to recover the original data again (e.g., "Diane Doe, John Jacobs, 220 Oak Street, Austin, Tex., 2018/02/24, 372000"). Worth repeating is that it is not necessary to decompress all of block B in order to decompress this transaction. Because a pre-computed dictionary is used to do the de-compression, each transaction may be decompressed individually, in any order. As a result, the decompression can be done in a very small amount of CPU time, thus increasing the overall efficiency of the computing system.

Over time, new transactions may be added to the blockchain that mention additional data (e.g., people, house numbers, street names, or cities, etc.) that have not been included in the blockchain before. In order to compress this new data effectively, new dictionaries may be constructed. Because blockchains are immutable, D-blocks are not modified once they are stored in the blockchain. Instead, a new D-block may be added to the blockchain with new dictionaries. In one example, this new D-block is block number 2,443 on the blockchain. Transactions in blocks added after block 2,443 may now use these new dictionaries for their encoding, if desired. Of course, they can also still use the dictionaries of block 1,443, if desired, as that block is also still available on the blockchain (and will be in perpetuity). In one embodiment, the determination of when to add a new D-block to the blockchain may be based on a trade-off. For example, it may be beneficial to add a new D-block if the anticipated additional compression of the next sequence of T-blocks exceeds the storage requirements of the new D-block itself. Here, "next sequence" means the T-blocks that are added in between two successive D-blocks.

Figure 8:
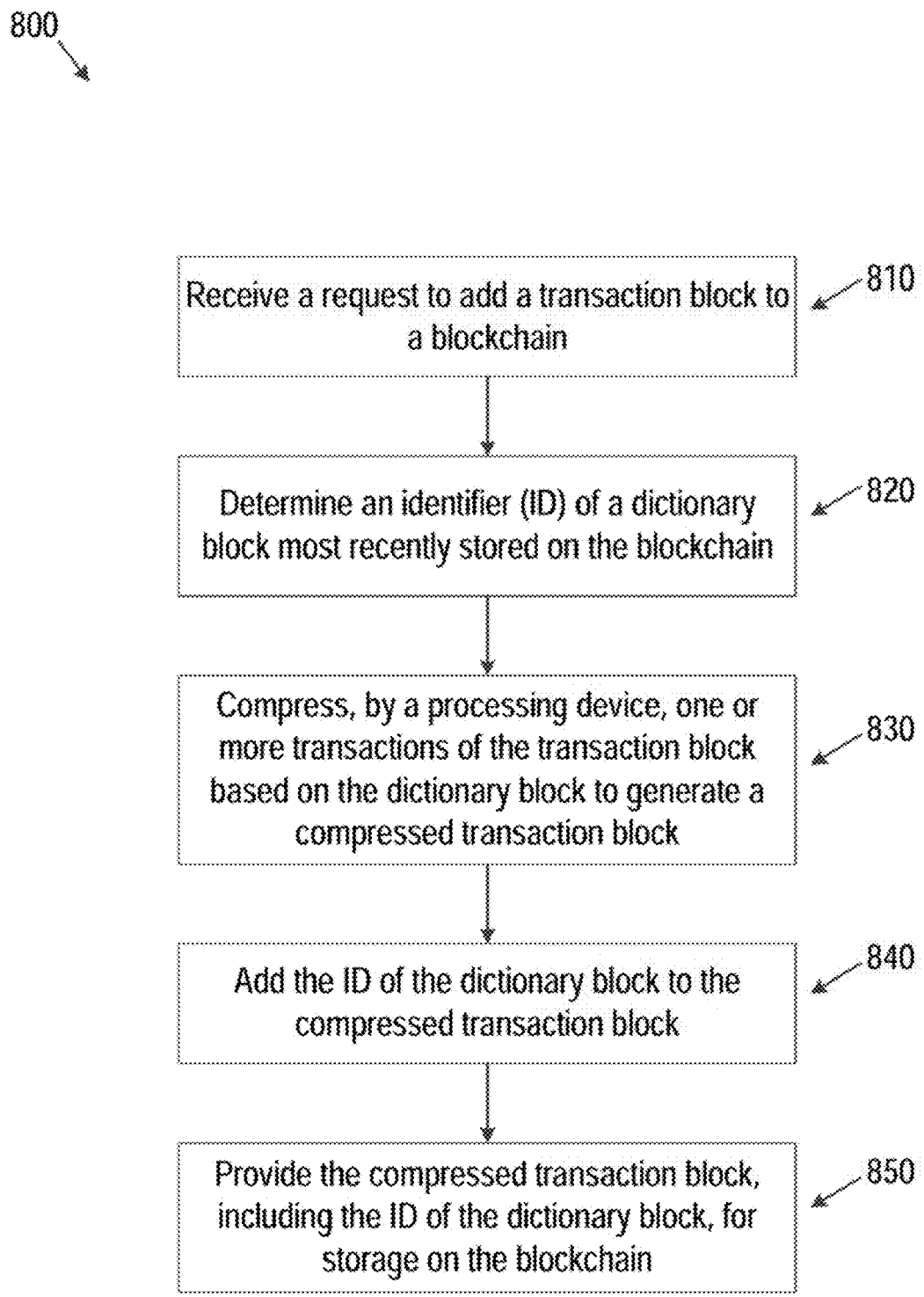
FIG. 8 is a graphical flow diagram illustrating a first method of reducing storage of blockchain metadata via dictionary-style compression, in accordance with some embodiments.

FIG. 8 is a graphical flow diagram illustrating a first method of reducing storage of blockchain metadata via dictionary-style compression, in accordance with some embodiments. For example, the processes described with reference to FIG. 8 may be performed by the processing logic of a blockchain system, as described herein.

Referring to FIG. 8, at block 810, processing logic receives a request to add a transaction block (e.g., T-block) to a blockchain. At block 820, processing logic determines an identifier (ID) of a dictionary block (e.g., D-block) most recently stored on the blockchain. In one embodiment, if no previous dictionary is available, and/or if the dictionaries that are available contain very few of the needed raw metadata values (below a threshold), processing logic may optionally generate a new dictionary block (D-Block), add it to the blockchain and then, only after the new D-Block has been added and confirmed, add the new T-Block.

In one embodiment, the dictionary block comprises a first dictionary corresponding to a first field of data in the transaction block, and the first dictionary comprises a first key-value pair representing compressed metadata and corresponding raw metadata of the first field, respectively. In another embodiment, the dictionary block further comprises a second dictionary corresponding to a second field of data in the transaction block, and wherein the second dictionary comprises a second key-value pair representing compressed metadata and corresponding raw metadata of the second field, respectively. In yet another embodiment, the dictionary block further comprises a data schema identifying the first dictionary and corresponding first field of data, and the second dictionary and corresponding second field of data.

At block 830, processing logic compresses, by a processing device, one or more transactions of the transaction block based on the dictionary block to generate a compressed transaction block. In one embodiment, to compress the one or more transactions of the transaction block based on the dictionary block to generate the compressed transaction block, the processing logic may identify raw metadata in a text field of the transaction block to be compressed, identify the first dictionary block based on the ID of the dictionary in the transaction block, and determine that the text field of the transaction block is the same as the first field of data of the transaction block. In one embodiment, processing logic may further determine, based on the data schema of the first dictionary block, that the text field of the transaction block corresponds to the first field of data of the first dictionary and based on the determining, identify compressed metadata corresponding to the raw metadata in the first dictionary. Processing logic may then replace the raw metadata with the corresponding compressed metadata.

At block 840, processing logic adds the ID of the dictionary block to the compressed transaction block, and at block 850, processing logic provides the compressed transaction block, including the ID of the dictionary block, for storage on the blockchain. In one embodiment, processing logic may further generate, based on a set of transaction blocks most recently added to the blockchain ledger, a new dictionary block and provide the new dictionary block for storage on the blockchain ledger. In one embodiment, the raw metadata that corresponds to a higher frequency value in the new dictionary block is assigned a smaller corresponding compressed metadata value than raw metadata corresponding to a lower frequency value.

Figure 9:
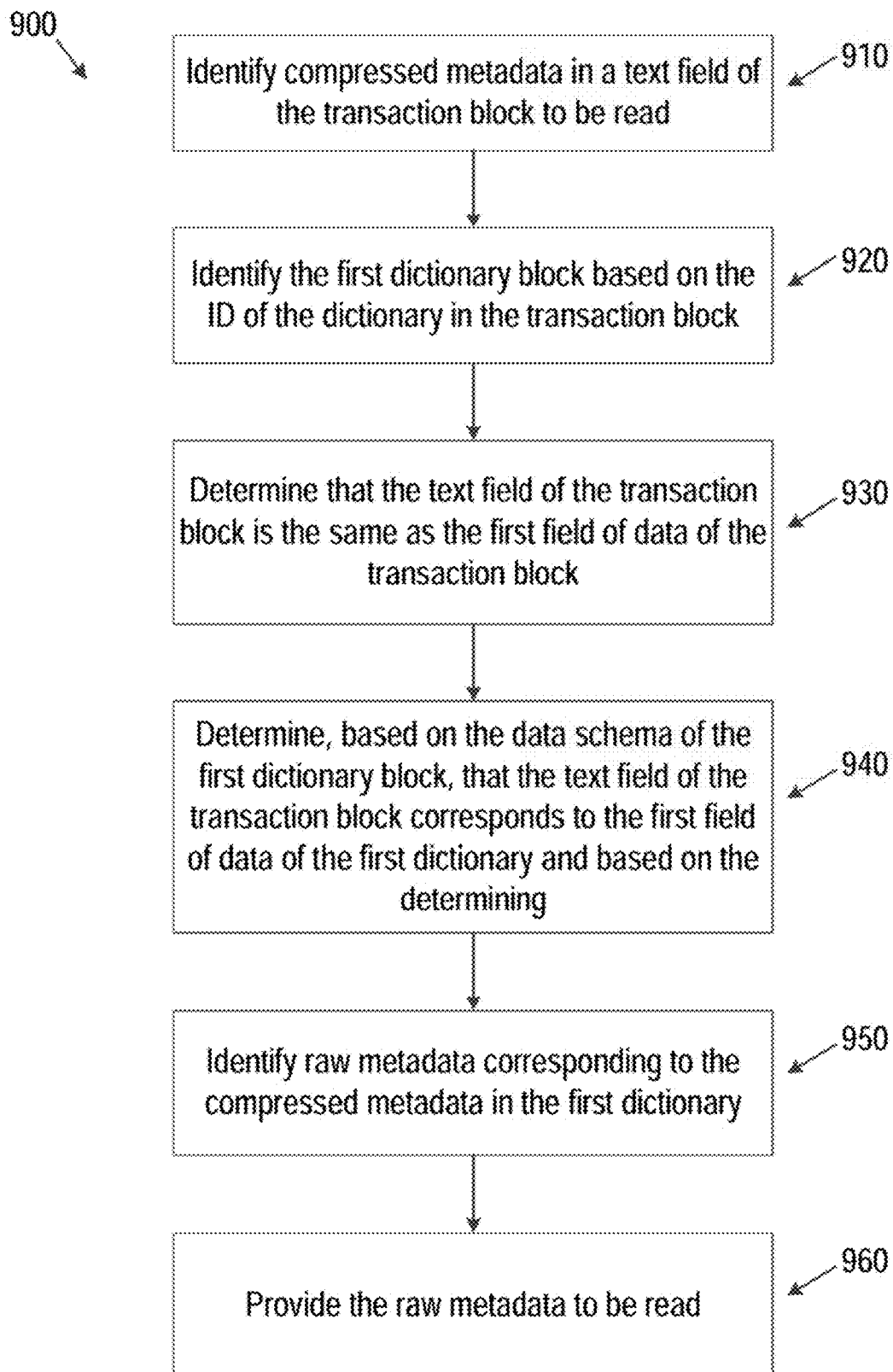
FIG. 9 is a graphical flow diagram illustrating a second method of reducing storage of blockchain metadata via dictionary-style compression, in accordance with some embodiments.

FIG. 9 is a graphical flow diagram illustrating a second method of reducing storage of blockchain metadata via dictionary-style compression, in accordance with some embodiments. For example, the processes described with reference to FIG. 9 may be performed by the processing logic of a blockchain system, as described herein.

Referring to FIG. 9, at block 910, to decompress the compressed data from the blockchain, processing logic may identify compressed metadata in a text field of the transaction block to be read, identify the first dictionary block based on the ID of the dictionary in the transaction block (920), and determine that the text field of the transaction block is the same as the first field of data of the transaction block (930). Processing logic at block 940 may further determine, based on the data schema of the first dictionary block, that the text field of the transaction block corresponds to the first field of data of the first dictionary and based on the determining, and identify raw metadata corresponding to the compressed metadata in the first dictionary (950). Processing logic may then provide the raw metadata to be read (960).

Figure 10:
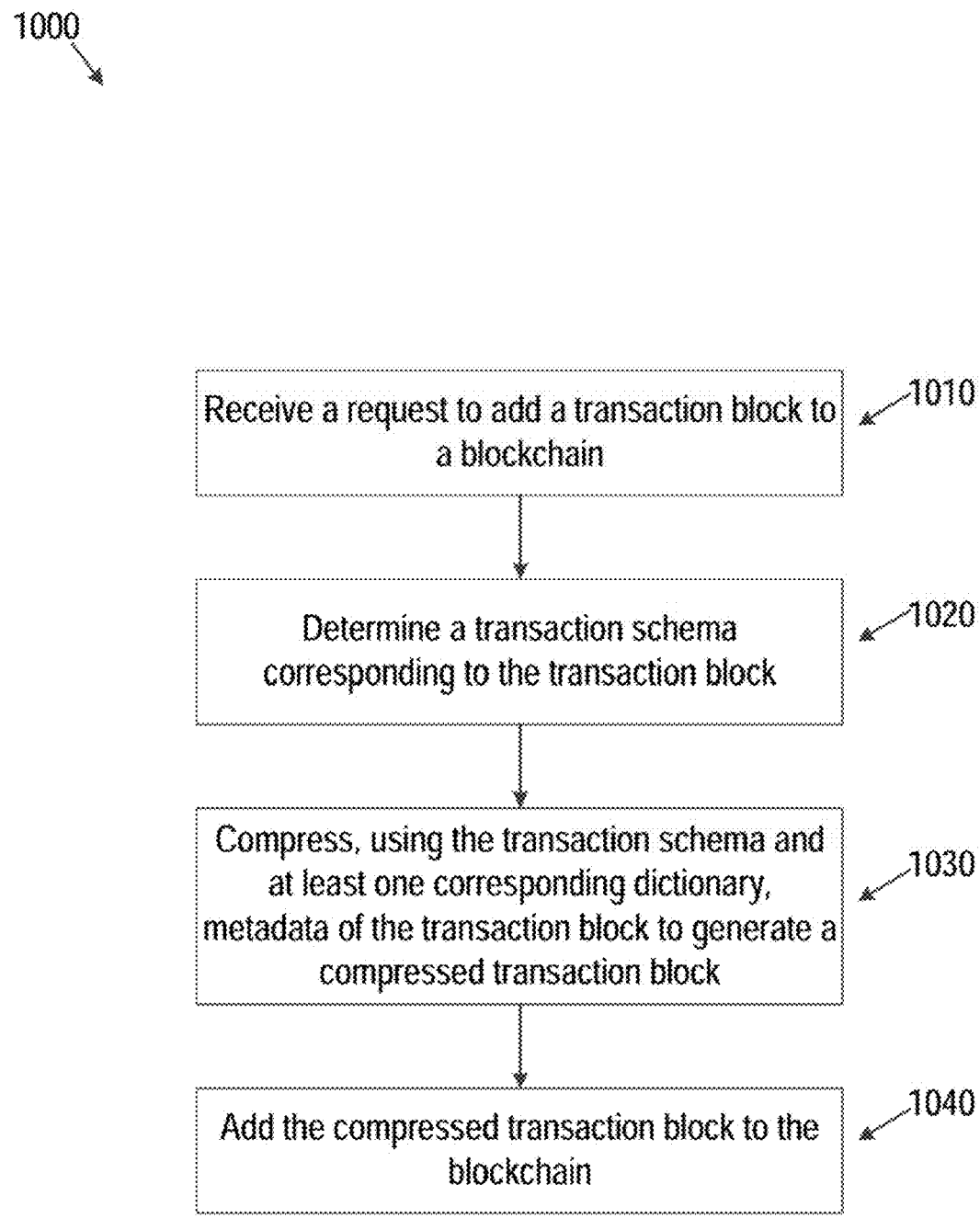
FIG. 10 is a graphical flow diagram illustrating a third method of reducing storage of blockchain metadata via dictionary-style compression, in accordance with some embodiments.

FIG. 10 is a graphical flow diagram illustrating a third method of reducing storage of blockchain metadata via dictionary-style compression, in accordance with some embodiments. For example, the processes described with reference to FIG. 10 may be performed by the processing logic of a blockchain system, as described herein.

Referring to FIG. 10, at block 1010, processing logic receives a request to add a transaction block to a blockchain, determines a transaction schema corresponding to the transaction block (block 1020), and compresses metadata of the transaction block to generate a compressed transaction block (block 1030). In other embodiments, processing logic may, for each transaction, determine a transaction schema corresponding to that transaction. In this case, a single transaction block may contain a heterogeneous collection of transaction types, compressed using different schemas. For better compression, transactions of the same type may be grouped together so the transaction schema need only be named once per group.

In one embodiment, processing logic compresses the metadata using the transaction schema and at least one corresponding dictionary. In other embodiments, other methods of compression may be used. At block 1040, processing logic adds the compressed transaction block to the blockchain.

In one embodiment, to determine the transaction schema corresponding to the transaction block, processing logic may receive an indication of the transaction schema from the transaction block. For example, the transaction block may include a dictionary block identifier (ID) of the corresponding dictionary and a schema ID of the transaction schema. In another embodiment, the transaction block may include a dictionary block of the corresponding dictionary.

In another embodiment, to determine the transaction schema corresponding to the transaction block, processing logic may determine whether a dictionary block exists on the blockchain, and, in response to determining that a dictionary block exists on the blockchain, receive an indication of the transaction schema from the dictionary block. In response to determining that the dictionary block does not exist on the blockchain, processing logic may add the dictionary block to the blockchain and receive an indication of the transaction schema from the dictionary block. In one embodiment, the dictionary block is the most recently added dictionary block. In other embodiments, other less recently added dictionary blocks may be used. In another embodiment, to determine the transaction schema corresponding to the transaction block, processing logic may receive an indication of the transaction schema from a transaction block of the blockchain.

In one embodiment, processing logic may determine if a transaction schema is outdated (e.g., via a time threshold or compression threshold). In response to a determination that the transaction schema is outdated, processing logic may update the transaction schema before compressing the metadata of the transaction block. In one embodiment, processing logic may determine that a compression level of the compressed transaction block is below a compression threshold, and, in response to the determination, generate a new dictionary and recompress the transaction block to generate the compressed transaction block.

In one embodiment, to add a dictionary block to the blockchain, processing logic may perform various setup operations, including but not limited to defining a metadata schema, associating dictionaries with the metadata schema, generating dictionaries, defining dictionary IDs, defining schema IDs, and adding dictionary blocks to the blockchain. For example, to define a metadata schema, processing logic may define a representation of the transaction's structure in a way that each part can be clearly identified (e.g., with an ID number, label, etc.). See, for example, the first row in FIG. 7, which defines eight parts (e.g., fields) of the transaction with each one identifiable via a label (e.g., seller, buyer, etc.) Processing logic may then define the metadata by the use of a dictionary identification number (ID). For example, the second row of FIG. 7 includes the dictionary ID for each of a transaction's metadata parts and value-type number for the transaction field amount. Additionally, a transaction field may be divided in sub-parts in order to define dictionaries that represent the full field more compactly. For example, the seller field can have first and last name parts to define dictionaries representing the seller field in a more efficient encoding representation.

To associate dictionaries with the metadata schema, processing logic may, given the metadata schema, determine the number of dictionaries needed to represent it. As FIG. 7 shows, there may be a one-to-one correspondence between one field and a dictionary in the case of columns 3 to 7, or a many-to-one correspondence as in the case the first two schema columns.

To generate dictionaries, processing logic may, using the schema definition and a set of transactions, generate each of the defined dictionaries according to the lossless data compression algorithm selected. Alternatively, dictionaries may be generated independently from the transaction information. This can be based on text database (DB) sources with information that adequately represents a field. For example, generating dictionaries of male first and last names in English using a name DB with most-used names sorted by frequency can be done off-line for applications that have English names metadata. These dictionaries can then be used to encode transactions with such name metadata.

To define dictionary IDs, processing logic may determine an identification number scheme for a dictionary that is generic enough to associate it with a dictionary block number, so that its reference in a given schema and/or transaction block explicitly determines which D-Block in the blockchain contains that dictionary. Similarly, to define the schema IDs, processing logic may determine an identification number scheme for a schema that is generic enough to associate it with a dictionary block number, so that its reference in a given transaction block explicitly determines which D-Block in the blockchain contains that schema.

In one embodiment, to add a D-Block to the blockchain, the dictionaries, schemas, and corresponding IDs may be added to the blockchain on a D-Block or on a current transaction block (T-Block) if the size of the D-Block is suitable for the given blockchain application. Algorithms used for achieving distributed consensus may include (but are not limited to) distributed consensus based on Proof of Work and distributed consensus based on Proof of Stake.

Figure 11:
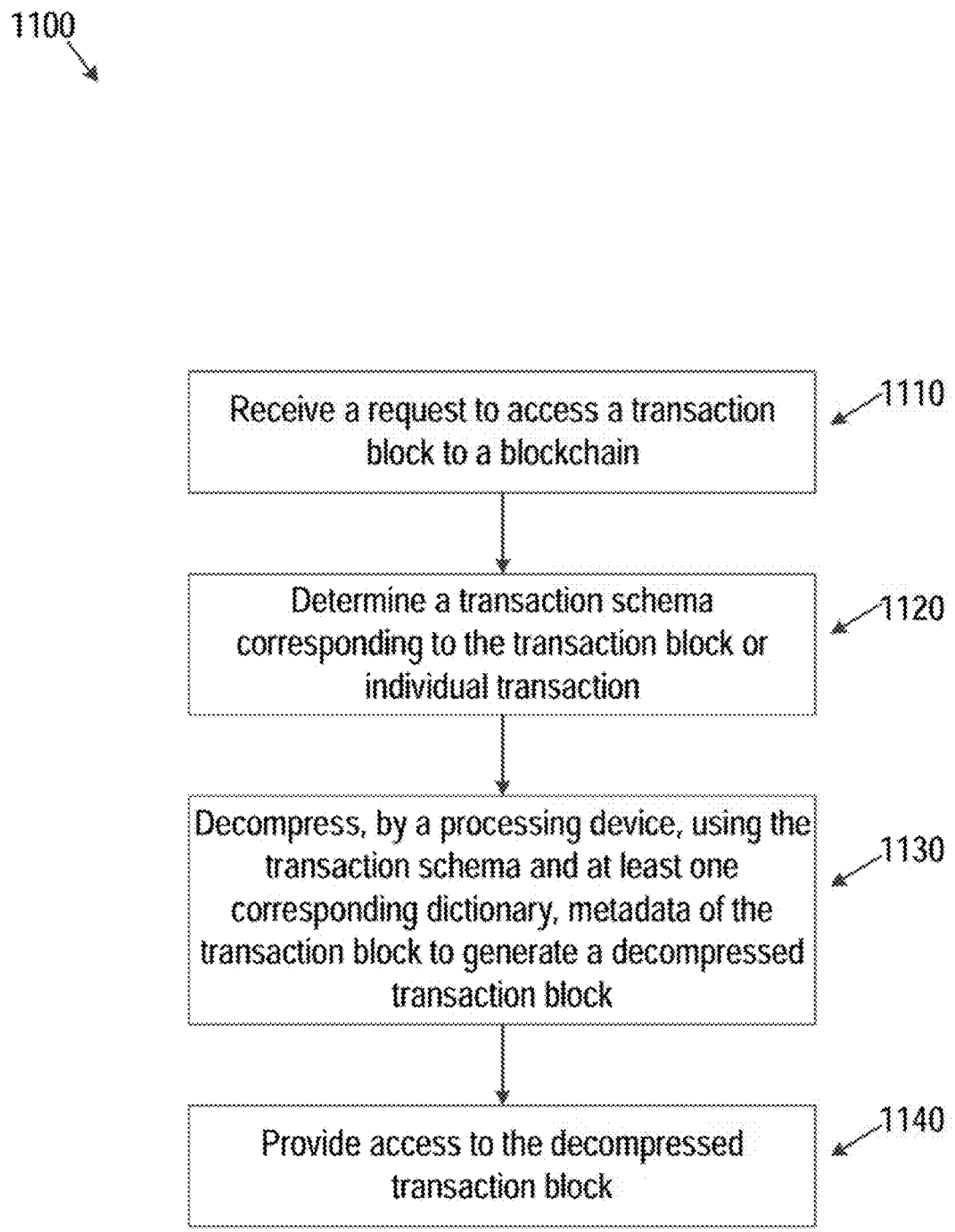
FIG. 11 is a graphical flow diagram illustrating a fourth method of reducing storage of blockchain metadata via dictionary-style compression, in accordance with some embodiments.

FIG. 11 is a graphical flow diagram illustrating a fourth method of reducing storage of blockchain metadata via dictionary-style compression, in accordance with some embodiments. For example, the processes described with reference to FIG. 11 may be performed by the processing logic of a blockchain system, as described herein.

Referring to FIG. 11, at block 1110, processing logic receives a request to access a transaction block on a blockchain, determines a transaction schema corresponding to the transaction block (or to an individual transaction) (block 1120), and decompresses, by a processing device metadata of the transaction block to generate a decompressed transaction block (block 1130). In one embodiment, processing logic uses the transaction schema and at least one corresponding dictionary to decompress the metadata. At block 1140, processing logic provides access to the decompressed transaction block (e.g., to be verified, sent to a requesting blockchain's client or service, etc.).

In one embodiment, to determine the transaction schema corresponding to the transaction block or individual transaction, processing logic may receive an indication of the transaction schema from the transaction block. For example, the transaction block may include a dictionary block identifier (ID) of the corresponding dictionary and a schema ID of the transaction schema. In another embodiment, the transaction block may include a dictionary block of the corresponding dictionary.

In one embodiment, to determine the transaction schema corresponding to the transaction block, processing logic may determine whether a dictionary block exists on the blockchain, and, in response to determining that a dictionary block exists on the blockchain, receive an indication of the transaction schema from the dictionary block. In one embodiment, the dictionary block is the most recently added dictionary block. In other embodiment, less recently added dictionary blocks may be used. In another embodiment, to determine the transaction schema corresponding to the transaction block, processing logic may receive an indication of the transaction schema from a transaction block of the blockchain.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 12:
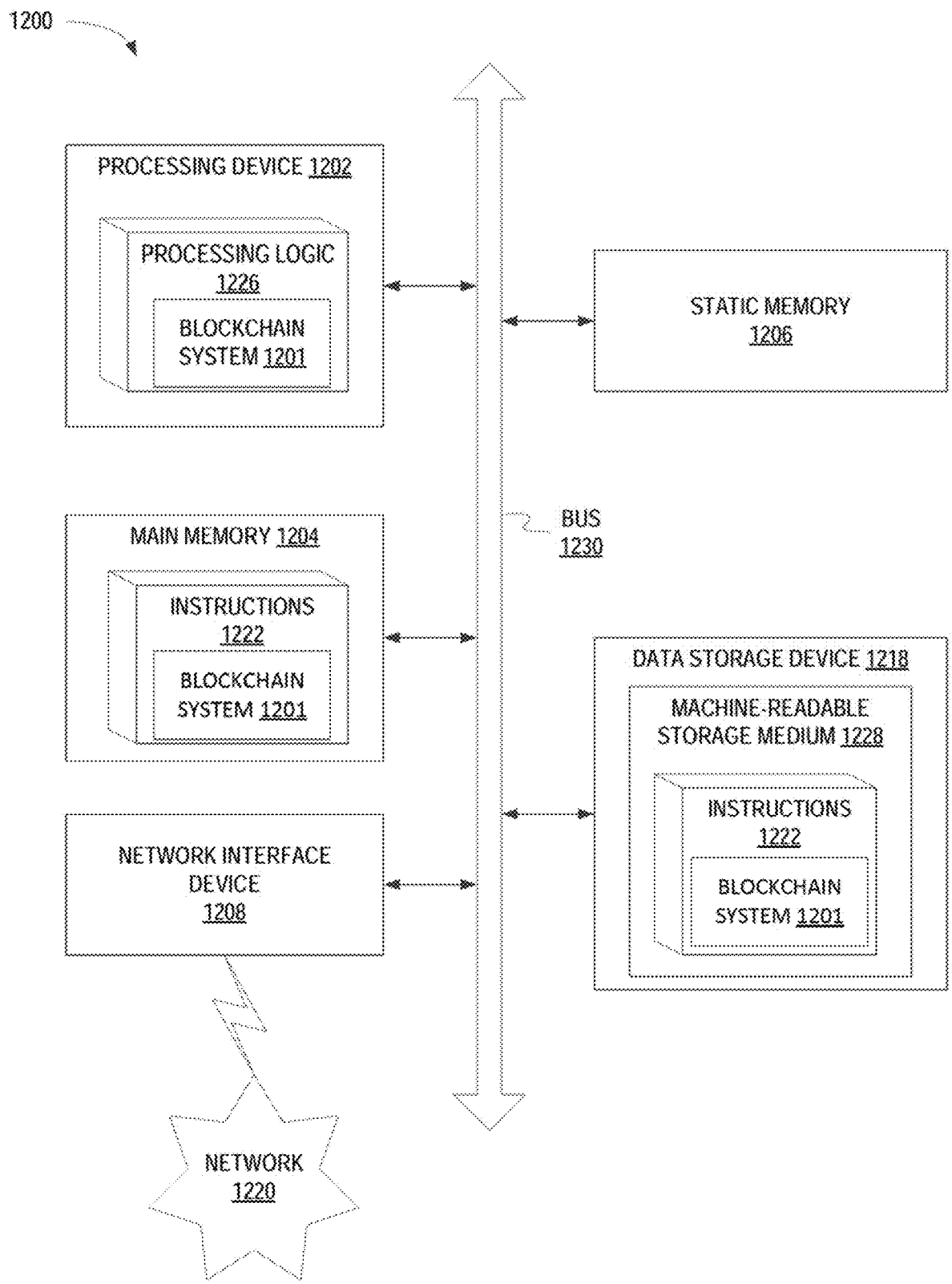
FIG. 12 is an illustration showing an example computing device that may implement the embodiments described herein.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 may be representative of a server computer system, such as a blockchain system as described herein.

The exemplary computer system 1200 includes a processing device 1202, a main memory 1204 (e.g., read-only memory (ROM), flash memory, dynamic random access memory (DRAM), a static memory 1206 (e.g., flash memory, static random access memory (SRAM), etc.), and a data storage device 1218, which communicate with each other via a bus 1230. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute processing logic 1226, which may be one example of a blockchain system 1201 for performing the operations and steps discussed herein.

The data storage device 1218 may include a machine-readable storage medium 1228, on which is stored one or more set of instructions 1222 (e.g., software) embodying any one or more of the methodologies of functions described herein, including instructions to cause the processing device 1202 to execute blockchain system 1201. The instructions 1222 may also reside, completely or at least partially, within the main memory 1204 or within the processing device 1202 during execution thereof by the computer system 1200; the main memory 1204 and the processing device 1202 also constituting machine-readable storage media. The instructions 1222 may further be transmitted or received over a network 1220 via the network interface device 1208.

The machine-readable storage medium 1228 may also be used to store instructions to perform the methods and operations described herein. While the machine-readable storage medium 1228 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, a magnetic storage medium (e.g., floppy diskette); an optical storage medium (e.g., CD-ROM); a magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of reducing the storage requirements of blockchain metadata via dictionary-style compression, the method comprising:
   receiving a request to add a transaction block to a blockchain;
   determining an identifier (ID) of a dictionary block most recently stored on the blockchain;
   compressing, by a processing device, one or more transactions of the transaction block based on the dictionary block to generate a compressed transaction block;
   adding the ID of the dictionary block to the compressed transaction block;
   providing the compressed transaction block, including the ID of the dictionary block, for storage on the blockchain;
   wherein the dictionary block comprises a first dictionary corresponding to a first field of data in the transaction block, and wherein the first dictionary comprises a first key-value pair representing compressed metadata and corresponding raw metadata of the first field, respectively, wherein the dictionary block further comprises a second dictionary corresponding to a second field of data in the transaction block, and wherein the second dictionary comprises a second key-value pair representing compressed metadata and corresponding raw metadata of the second field, respectively, wherein the dictionary block further comprises a data schema identifying the first dictionary and corresponding first field of data, and the second dictionary and corresponding second field of data; and
   wherein compressing the one or more transactions of the transaction block based on the dictionary block to generate the compressed transaction block comprises:
      identifying raw metadata in a text field of the transaction block to be compressed; identifying the first dictionary block based on the ID of the dictionary in the transaction block;
      determining that the text field of the transaction block is the same as the first field of data of the transaction block;
      determining, based on the data schema of the first dictionary block, that the text field of the transaction block corresponds to the first field of data of the first dictionary;
      based on the determining, identifying compressed metadata corresponding to the raw metadata in the first dictionary; and
      replacing the raw metadata with the corresponding compressed metadata.

2. A method of reducing the storage requirements of blockchain metadata via dictionary-style compression, the method comprising:
   receiving a request to add a transaction block to a blockchain;
   determining an identifier (ID) of a dictionary block most recently stored on the blockchain;
   compressing, by a processing device, one or more transactions of the transaction block based on the dictionary block to generate a compressed transaction block;
   adding the ID of the dictionary block to the compressed transaction block;
   providing the compressed transaction block, including the ID of the dictionary block, for storage on the blockchain;
   wherein the dictionary block comprises a first dictionary corresponding to a first field of data in the transaction block, and wherein the first dictionary comprises a first key-value pair representing compressed metadata and corresponding raw metadata of the first field, respectively, wherein the dictionary block further comprises a second dictionary corresponding to a second field of data in the transaction block, and wherein the second dictionary comprises a second key-value pair representing compressed metadata and corresponding raw metadata of the second field, respectively, wherein the dictionary block further comprises a data schema identifying the first dictionary and corresponding first field of data, and the second dictionary and corresponding second field of data;

identifying compressed metadata in a text field of the transaction block to be read;

identifying the first dictionary block based on the ID of the dictionary in the transaction block;

determining that the text field of the transaction block is the same as the first field of data of the transaction block;

determining, based on the data schema of the first dictionary block, that the text field of the transaction block corresponds to the first field of data of the first dictionary;

based on the determining, identifying raw metadata corresponding to the compressed metadata in the first dictionary; and providing the raw metadata to be read.

3. A method of reducing the storage requirements of blockchain metadata via dictionary-style compression, the method comprising:

receiving a request to add a transaction block to a blockchain;

determining an identifier (ID) of a dictionary block most recently stored on the blockchain;

compressing, by a processing device, one or more transactions of the transaction block based on the dictionary block to generate a compressed transaction block;

adding the ID of the dictionary block to the compressed transaction block;

providing the compressed transaction block, including the ID of the dictionary block, for storage on the blockchain;

generating, based on a set of transaction blocks most recently added to the blockchain, a new dictionary block; and providing the new dictionary block for storage on the blockchain.

4. The method of reducing storage of blockchain metadata via dictionary style compression of claim 3, wherein raw metadata corresponding to a higher frequency value in the new dictionary block is assigned a smaller corresponding compressed metadata value than raw metadata corresponding to a lower frequency value.

* * * * *